(12) United States Patent
Hayden et al.

(10) Patent No.: US 7,410,214 B2
(45) Date of Patent: Aug. 12, 2008

(54) APPARATUS FOR MEASURING CHILD SEAT ANCHOR TENSION

(75) Inventors: Eric C. Hayden, Cicero, IN (US);
Royce L. Rennaker, Converse, IN (US);
Chance L Scales, Kokomo, IN (US);
Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 34 days.

(21) Appl. No.: 10/705,708

(22) Filed: Nov. 11, 2003

(65) Prior Publication Data

US 2004/0160044 A1 Aug. 19, 2004

(51) Int. Cl.
*B60R 21/207* (2006.01)
*B60N 2/28* (2006.01)

(52) U.S. Cl. .................. 297/253; 297/217.3; 280/735

(58) Field of Classification Search .......... 297/217.3, 297/253; 340/573.1, 665, 667; 280/735
See application file for complete search history.

(56) References Cited

U.S. PATENT DOCUMENTS

| | | | | |
|---|---|---|---|---|
| 3,737,849 | A * | 6/1973 | Mead .................. | 340/457.1 |
| 5,690,356 | A * | 11/1997 | Lane, Jr. .............. | 280/735 |
| 5,941,601 | A * | 8/1999 | Scott et al. ........... | 297/253 |
| 5,996,421 | A | 12/1999 | Husby | |
| 6,230,088 | B1 * | 5/2001 | Husby ................. | 701/45 |
| 6,301,977 | B1 * | 10/2001 | Stojanovski .......... | 73/862.393 |
| 6,371,516 | B1 * | 4/2002 | Miyagawa ............ | 280/735 |
| 6,419,199 | B1 * | 7/2002 | Skofljanec et al. .... | 248/503.1 |
| 6,481,750 | B1 * | 11/2002 | Kalina et al. ......... | 280/801.1 |
| 6,522,257 | B1 * | 2/2003 | Jakob et al. .......... | 340/686.1 |
| 6,605,877 | B1 | 8/2003 | Patterson et al. | |
| 6,725,727 | B2 * | 4/2004 | Rogers et al. ......... | 73/779 |
| 6,764,095 | B2 * | 7/2004 | Stephan et al. ....... | 280/735 |
| 7,224,270 | B2 * | 5/2007 | Patterson et al. ...... | 340/457.1 |
| 2001/0042981 | A1 | 11/2001 | Kohut et al. | |
| 2002/0024257 | A1 | 2/2002 | Fujimoto et al. | |
| 2002/0038573 | A1 | 4/2002 | Clark | |
| 2002/0171234 | A1 | 11/2002 | Stephen et al. | |
| 2005/0275554 | A1 * | 12/2005 | Patterson et al. ...... | 340/667 |
| 2005/0280297 | A1 * | 12/2005 | Patterson et al. ...... | 297/217.4 |

FOREIGN PATENT DOCUMENTS

WO 01/87676 11/2001

OTHER PUBLICATIONS

European Search Report dated Aug. 3, 2004.

* cited by examiner

*Primary Examiner*—Joseph F Edell
(74) *Attorney, Agent, or Firm*—Jimmy L. Funke

(57) ABSTRACT

A child seat anchor apparatus includes at least one sensor for measuring tension exerted on a system including a pair of anchor brackets disposed between the bottom and back cushions of a vehicle seat. In a first mechanization, the anchor brackets are directly coupled to individual sensors mounted on an anchor frame that is bolted to the seat frame. In a second mechanization, the anchor brackets are fastened to an anchor frame that is pivotably mounted on the seat frame, and the anchor frame is additionally coupled to the seat frame through a single sensor responsive to the tension exerted on the anchor frame by the anchor brackets.

19 Claims, 2 Drawing Sheets

APPARATUS FOR MEASURING CHILD SEAT ANCHOR TENSION

TECHNICAL FIELD

The present invention relates to a child seat anchor system for a motor vehicle seat, and more particularly to apparatus for measuring the tension exerted on the anchor system.

BACKGROUND OF THE INVENTION

Vehicle occupant weight sensing systems are useful in connection with air bags and other pyrotechnically deployed restraints as a means of characterizing the occupant for purposes of determining whether to allow or suppress deployment of the restraints. In cases where an infant seat or child booster seat is placed on the seat cushion and cinched down with the seat belt, the presence of the infant or child seat can be detected based in part on a measure of the seat belt tension. However, in cases where the vehicle seat is equipped with a child seat anchoring system such as the LATCH (Lower Anchors and Tethers for CHildren) system, the infant or child seat can be secured using the seat anchors instead of the seat belt. Since tension applied to such child seat anchors produces an effect similar to that which occurs when the child seat is secured with the seat belt, it is desired to measure the tension exerted on such a child seat anchoring system.

SUMMARY OF THE INVENTION

The present invention is directed to apparatus for measuring the tension exerted on a child seat anchoring system including a pair of anchor brackets disposed between the bottom and back cushions of a vehicle seat. In a first embodiment, the anchor brackets are directly coupled to individual tension sensors mounted on an anchor frame that is bolted to the seat frame supporting the bottom cushion of the seat. In a second embodiment, the anchor brackets are fastened to an anchor frame that is pivotably mounted on the seat frame, and the anchor frame is additionally coupled to the seat frame through a single strain sensor responsive to the tension exerted on the anchor frame by the anchor brackets.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
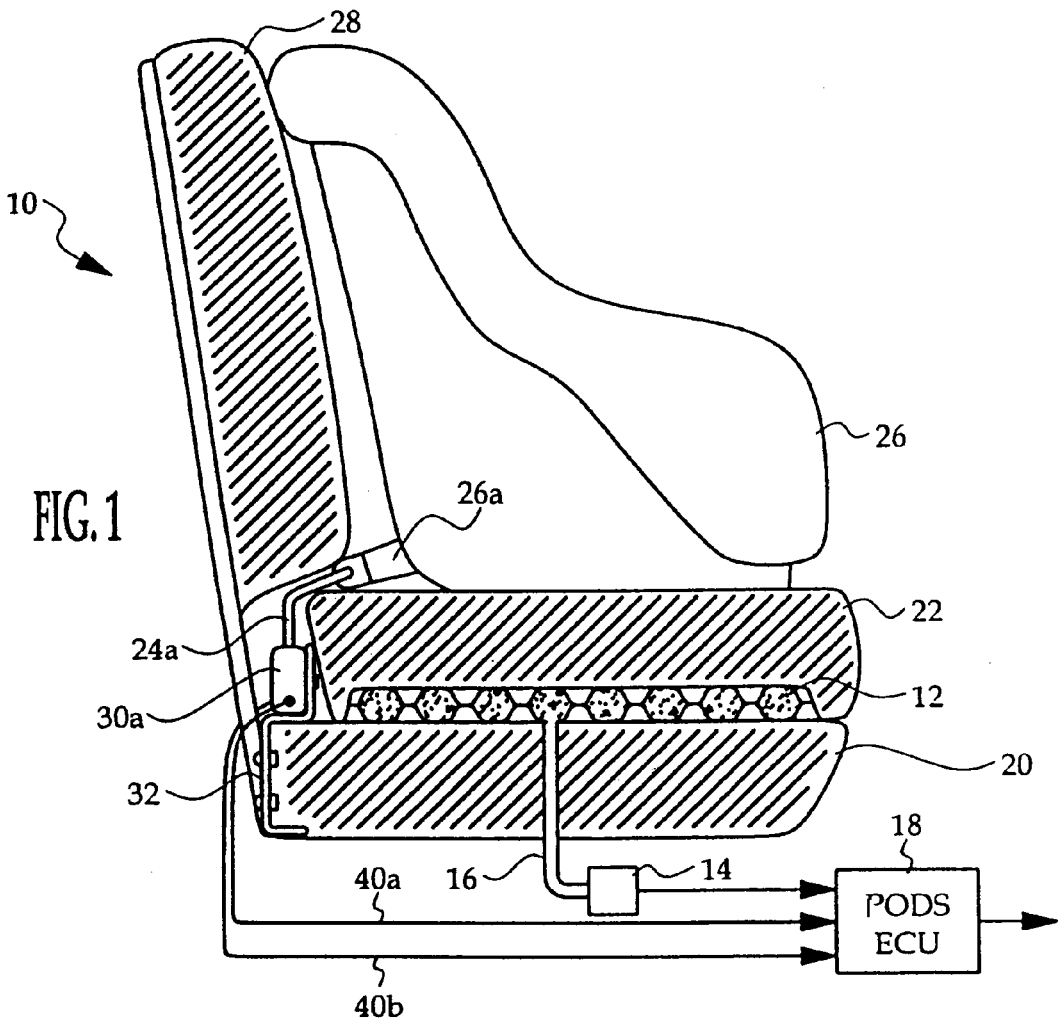
FIG. 1 is a diagram of a vehicle seat including an occupant weight estimation apparatus and a child seat anchor tension measurement apparatus according to a first embodiment of this invention.
Figure 2:
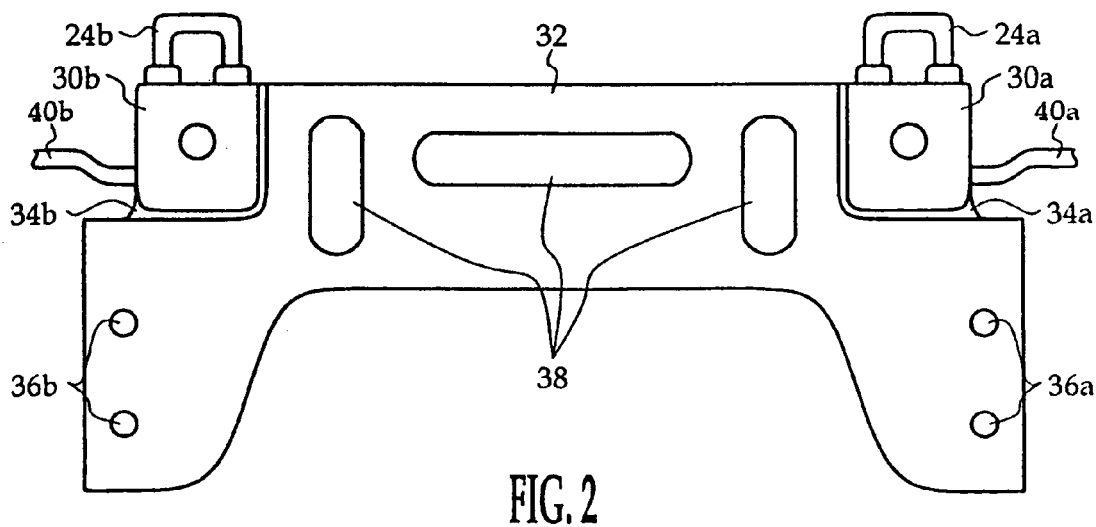
FIG. 2 is a rear view of the anchor tension measurement apparatus of FIG. 1.

Referring to FIGS. 1-2, the present invention is disclosed in the context of a vehicle passenger seat 10 equipped with a fluid-filled seat cushion bladder 12 for estimating the weight of a seat occupant based on the fluid pressure in the bladder 12. An exit port of the bladder 12 is coupled to a pressure sensor 14 by a tube 16, and the pressure sensor output is supplied to a passenger occupant detection system electronic control unit (PODS ECU) 18, which determines if deployment of supplemental restraints for the occupant of seat 10 should be enabled or disabled. In general, however, the present invention also applies to other types of occupant weight sensing systems, such as systems that sense the strain in seat frame 20, or systems that include a network of pressure sensitive cells distributed over the seating area of bottom cushion 22.

The seat 10 is equipped with a pair of child seat anchor brackets 24a, 24b for securely fastening an infant or child booster seat 26 to the seat 10 via the tethers 26a (only one of which is depicted in FIG. 1). The anchor brackets 24a, 24b are located near the left and right rear corners of the cushion 22, and the outboard end of each bracket 24a, 24b is disposed in a gap between the cushions 22 and 28 as shown.

Figure 3:
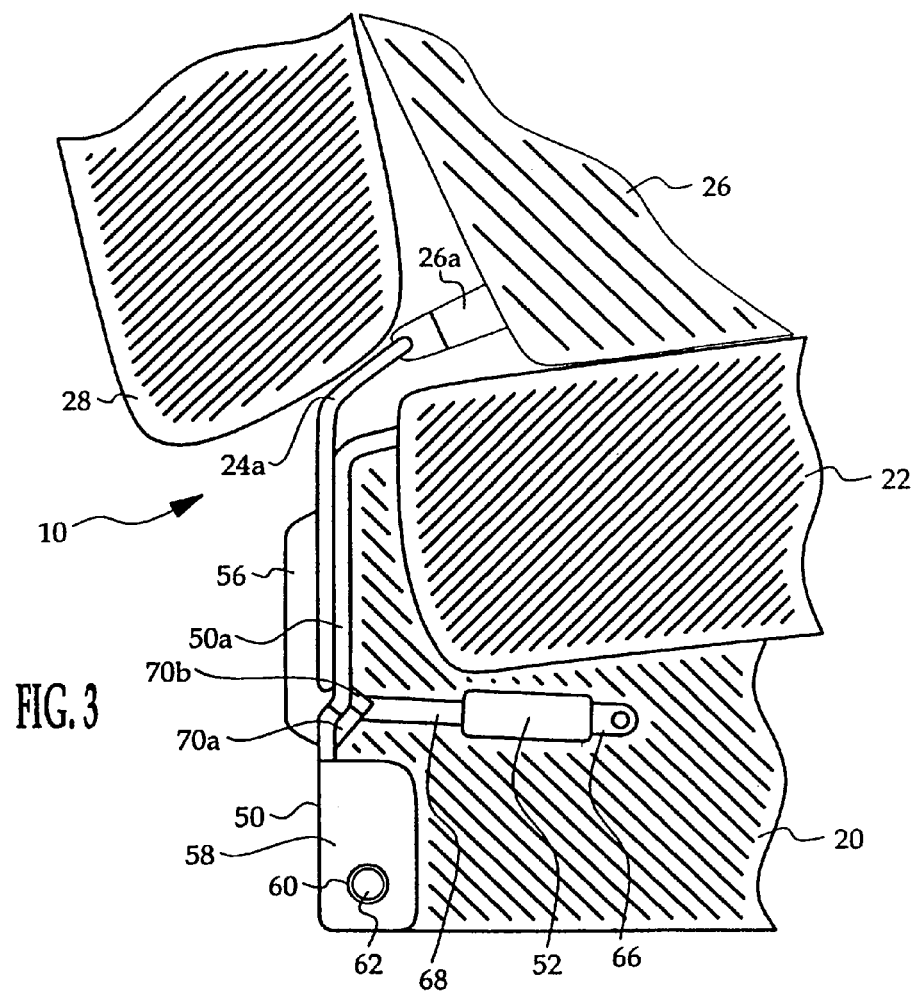
FIG. 3 is a partial diagram of a vehicle seat equipped with a child seat anchor tension measurement apparatus according to a second embodiment of this invention.
Figure 4:
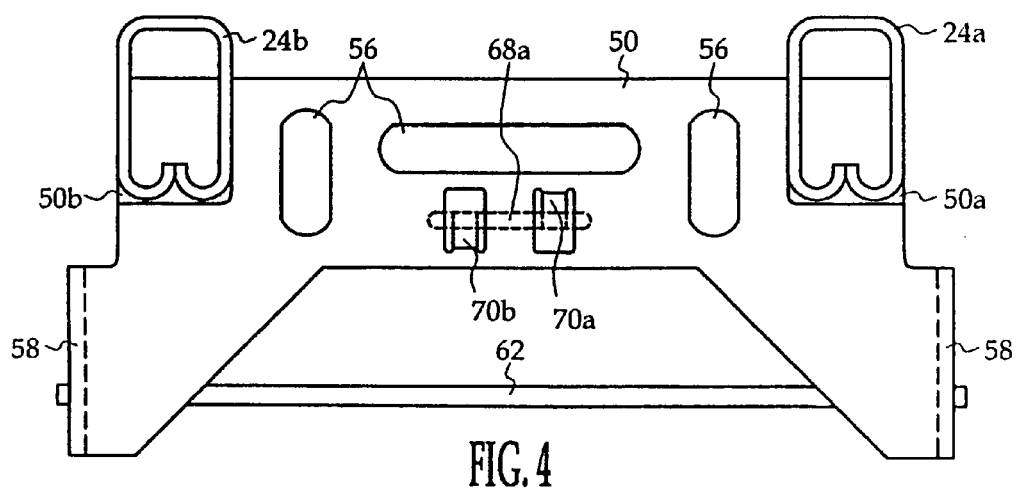
FIG. 4 is rear view of the anchor tension measurement apparatus of FIG. 3.

In general, the present invention is directed to an apparatus including at least one tension or strain sensor coupled to an anchor frame for measuring the tension exerted on the anchor brackets 24a, 24b. FIGS. 1-2 depict a first embodiment where the anchor brackets 24a, 24b are directly coupled to individual tension sensors 30a, 30b mounted on an anchor frame 32 that is bolted to the seat frame 20. FIGS. 3-4 depict a second embodiment of this invention where the anchor brackets 24a, 24b are fastened to an anchor frame 50 that is pivotably mounted on the seat frame 20, and a single strain sensor 52 coupled between the seat frame 20 and the anchor frame 50 measures the force applied to the anchor frame 50 by the anchor brackets 24a, 24b. The strain sensors 30a, 30b, 52 may be constructed as disclosed, for example, in the U.S. Pat. No. 6,605,877, issued on Aug. 12, 2003 and incorporated herein by reference.

Referring to the embodiment of FIGS. 1-2, the anchor frame 32 is contoured to form right and left pocket areas 34a, 34b at the leading edges thereof, and the tension sensors 30a, 30b are bolted into the respective pocket areas. The anchor frame 32, in turn, is bolted to the seat frame 20 via the apertures 36a, 36b. If desired, the anchor frame 32 can be configured so that the sensors 30a, 30b are essentially aligned with the child seat tethers 26a, in which case the anchor brackets 24a, 24b will be straight instead of angled. The anchor frame 32 may be stamped sheet metal, for example, and surface contours 38 may be included to provide increased stiffness. The tension sensors 30a, 30b develop electrical signals corresponding to the tension exerted on the anchor brackets 24a, 24b, respectively, and such signals are provided to PODS ECU 18 via lines 40a, 40b. In cases where the child seat tethers 26a are formed with a single strip of material passing through the infant or child seat 26, one of the anchor brackets 24a, 24b can be welded directly to the anchor frame 32 as shown in FIGS. 3-4, and the single tension sensor 30a or 30b will provide an adequate measure of the combined tension applied to the anchor brackets 24a, 24b. The PODS ECU 18 utilizes the anchor tension signals to detect the presence of an infant or child seat 26, and also to compensate the occupant seat weight indication (the pressure signal output of pressure sensor 14, for example) or a threshold to which the occupant seat weight indication is compared.

Referring to the embodiment of FIGS. 3-4, anchor frame 50 is contoured to form right and left pocket areas 50a, 50b at the leading edges thereof, and the anchor brackets 24a, 24b are welded into the respective pocket areas 50a, 50b. As with the anchor frame 32, the anchor frame 50 may be stamped sheet metal, for example, and include surface contours 56 to provide increased stiffness. The lower sides of anchor frame 50 are flanged as indicated by the reference numerals 58, each flange 58 having a mounting aperture 60 as shown in FIG. 3. A rod 62 (or two individual posts) securely fastened to the seat frame 20 passes through the apertures 60 to pivotally support the anchor frame 50 with respect to the seat frame 20. The anchor frame 50 is additionally coupled to the seat frame 20 by the tension sensor 52 so that tension applied to the anchor brackets 24a, 24b produces a corresponding force that is measured by the sensor 52. Referring to FIG. 3, a mounting tab 66 formed at one end of sensor 52 is fastened to seat frame 20, and a rod 68 formed at the other end of sensor 52 is secured to the anchor frame 50. In the illustrated embodiment, the rod 68 terminates in a cross-piece 68a that is captured by a pair of oppositely depending tabs 70a, 70b formed in anchor frame 50. Tension applied to the anchor brackets 24a, 24b tends to rotate the anchor frame 50 toward the infant seat 26 about the rod 62, and the resulting force measured by sensor 52 provides a measure of the total tension. As with the embodiment of FIGS. 1-2, the output of tension sensor 52 is provided to PODS ECU 18, which utilizes the anchor tension signals to detect the presence of an infant or child seat 26, and to compensate the occupant seat weight indication or a threshold to which the occupant seat weight indication is compared.

In summary, the present invention provides a reliable and cost-effective apparatus for measuring the tension exerted on a pair of child seat anchor brackets in a vehicle seat. While the invention has been described in reference to the illustrated embodiments, it should be understood that various modifications in addition to those mentioned above will occur to persons skilled in the art. For example, the strain sensors 30a, 30b, 52 may be replaced with suitably mounted strain gauges, and so on. Accordingly, it will be understood that anchor tension measurement devices incorporating these and other modifications may fall within the scope of this invention, which is defined by the appended claims.

The invention claimed is:

1. An apparatus for measuring a cinching tension on a child seat placed on a bottom cushion of a vehicle seat, said vehicle seat having a pressure sensor disposed therein operative to monitor the weight of an occupant and provide an occupant weight output signal to an occupant detection system electronic control unit, said child seat having first and second tethers affixed thereto for cinching said child seat to said vehicle seat independently of an occupant restraining seat belt system associated with said vehicle seat, said apparatus comprising:
    first and second laterally spaced child seat anchor brackets straddling said child seat in proximity to said bottom cushion, said first and second child seat anchor brackets being adapted to tensively secure said first and second tethers to said vehicle seat, respectively;
    an anchor frame extending across a lateral width dimension of the vehicle seat and secured to a frame of the vehicle seat; and
    a tension sensor securing said first child seat anchor bracket to a first end of said anchor frame, and means securing said second child seat anchor bracket to a second end of said anchor frame, said tension sensor providing an output signal to said occupant detection system electronic control unit as a function of the sensed tension in said tethers straps.

2. The apparatus of claim 1, wherein said tension sensor includes a first portion rigidly secured to said anchor frame and a second portion integral with a respective child seat anchor bracket.

3. In a vehicle seat assembly including a generally vertically disposed back cushion, a seat portion including a generally horizontally disposed bottom cushion carried upon a seat frame, pressure sensor means disposed within said seat portion operative to monitor the weight of an occupant and provide an occupant weight output signal to an occupant detection system electronic control unit, and an occupant restraining seat belt, an apparatus for measuring the tension exerted on a plurality of tethers by a child seat disposed on said bottom cushion, said tethers arranged for securing said child seat to said vehicle seat assembly, said apparatus comprising:
    a plurality of laterally spaced child seat anchor brackets straddling said child seat, each anchor bracket correspondingly adapted to tensively secure one of each tether affixed to said child seat; and
    a tension sensor mountingly coupled between said seat frame and at least one of said child seat anchor brackets, said tension sensor operative to provide a tension sensor output signal to said occupant detection system electronic control unit as a function of the sensed tension in said tethers.

4. The apparatus of claim 3, wherein said occupant detection system electronic control unit is operative to generate an output signal as a function of said occupant weight output signal and said tension sensor output signal.

5. The apparatus of claim 3, further comprising an anchor frame mechanically interconnecting said seat frame and said tension sensor.

6. The apparatus of claim 5, wherein said anchor frame is rigidly affixed to said seat frame.

7. The apparatus of claim 5, wherein said anchor frame is secured to said seat frame by a pivot coupling.

8. The apparatus of claim 5, wherein said anchor frame defines a pocket area for nestingly receiving and securing said tension sensor therein.

9. The apparatus of claim 8, wherein said pocket area is integrally formed adjacent one lateral end of said anchor frame.

10. The apparatus of claim 5, wherein said anchor frame defines surface contours therein to enhance characteristic stiffness of said anchor frame.

11. The apparatus of claim 10, wherein said surface contours are integrally formed in said anchor frame as a plurality of laterally spaced depressions therein.

12. The apparatus of claim 5, wherein said apparatus comprises a tension sensor associated with each said child seat anchor bracket, each of said tension sensors including a first portion rigidly secured to said anchor frame and a second portion integral with a corresponding child seat anchor bracket.

13. The apparatus of claim 3, wherein said apparatus comprises a plurality of tension sensors, one tension sensor associated with each child seat anchor bracket.

14. The apparatus of claim 13, wherein each said tension sensor is operative to provide an associated tension sensor output signal to said occupant detection system electronic control unit.

15. The apparatus of claim 3, further comprising:
    an anchor frame rigidly secured to each anchor bracket, and secured to the seat frame,
    said tension sensor including a first portion coupled to said anchor frame and a second portion coupled to the seat frame.

16. The apparatus of claim 15, wherein said anchor frame is secured to the seat frame by a pivot coupling, and the first portion of said sensor is coupled to said anchor frame between said pivot joint and said anchor bracket.

17. The apparatus of claim 15, wherein said anchor frame extends laterally across said seat, and each child seat anchor brackets is rigidly secured to laterally opposite ends of said anchor frame such that each of said anchor brackets are at least partially disposed in said juncture gap between back and bottom cushions of said vehicle seat.

18. The apparatus of claim 17, wherein the first portion of said sensor is coupled to said anchor frame at a point intermediate first and second child seat anchor brackets.

19. The apparatus of claim 18, wherein said anchor frame is secured to the seat frame by a pivot coupling, and the first portion of said sensor is coupled to said anchor frame at a point intermediate said pivot joint and said anchor brackets.

* * * * *